JOSEPH A. DINSMORE
INVENTOR.

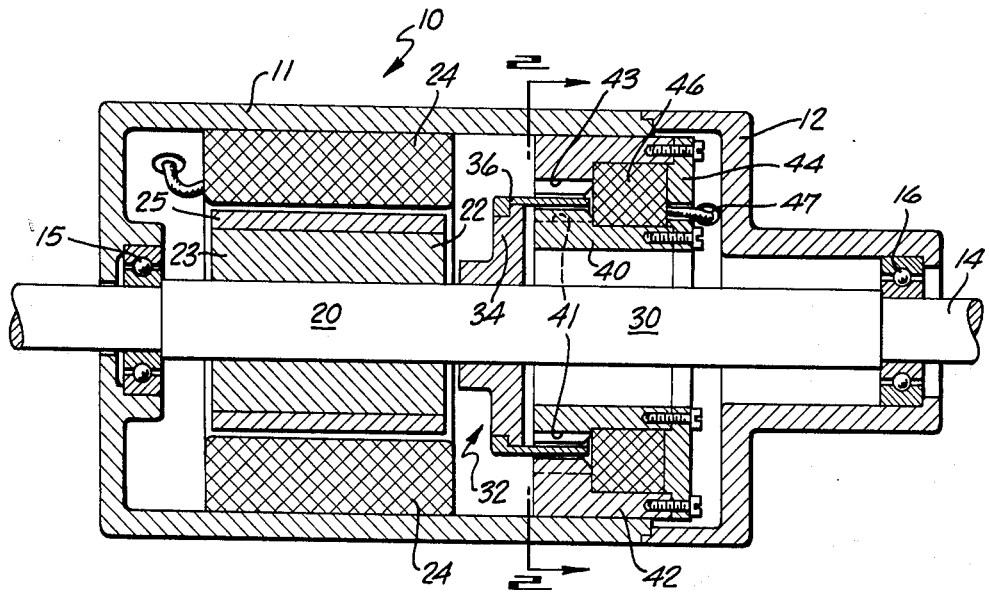
FIG_1
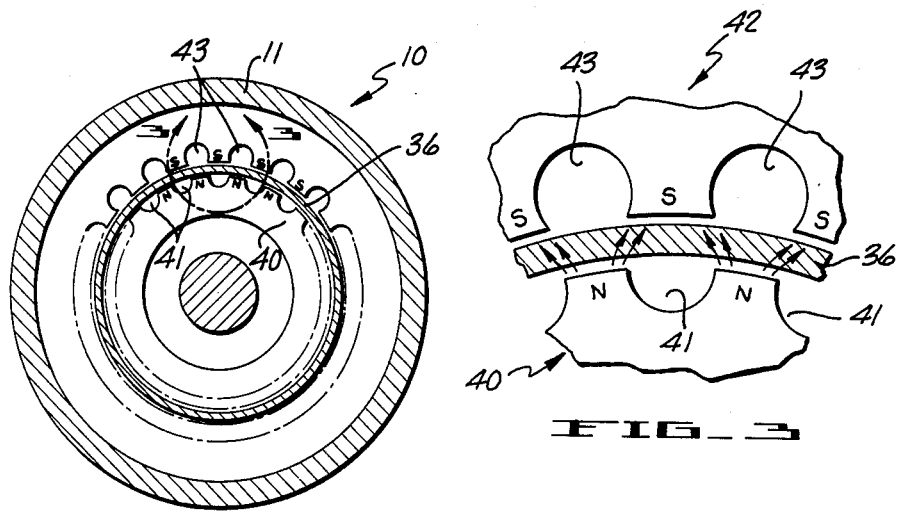
FIG_2
FIG_3
JOSEPH A. DINSMORE
INVENTOR.
BY Robert G. Clay
ATTORNEY Feb. 15, 1966   J. A. DINSMORE   3,235,758
CONTROLLED DRIVE MECHANISMS
Filed April 2, 1962                    2 Sheets-Sheet 2

BY Robert H. Clay

ATTORNEY 3,235,758
CONTROLLED DRIVE MECHANISMS
Joseph A. Dinsmore, San Carlos, Calif., assignor to Ampex Corporation, Redwood City, Calif., a corporation of California
Filed Apr. 2, 1962, Ser. No. 184,479
8 Claims. (Cl. 310—93)

This invention relates to drive motor systems and more particularly to an arrangement for controlling the speed of rotation of a drive shaft for magnetic tape systems.

In drive arrangements for magnetic tape transport mechanisms, as well as in other similar applications, it is extremely important to provide a drive speed that is as constant as possible at a selected speed setting. The drive mechanism should sensitively and rapidly return to the selected speed when caused to deviate for any reason. On the other hand, it is desirable to be able to adjust this speed to a number of different settings, so that the tape may be transported at any of a number of different preselected speeds. It is also highly desirable that the output shaft torque remain substantially constant for the various nominal settings of shaft speed.

It is well known that alternating current (A.C.) motors of the synchronous type inherently operate at a fixed speed that is relative to the frequency of the A.C. source. Some variation in the speeds available from a synchronous motor is possible since the motor can be made to rotate at A.C. line frequency or an integral submultiple thereof. However, the number of output speeds available from a synchronous motor is still insufficient for use in a versatile tape transport mechanism.

Direct current (D.C.) motors may be controlled over a wide range of output speeds but such regulation requires substantially more control power than is needed for the variable speed synchronous motor. There are added drawbacks arising from the use of brushes in a D.C. motor, which add to the maintenance and electrical interference problems. Furthermore, D.C. motors require means for rectification and regulation of the voltage obtained from the conventional A.C. power line, and the output torque usually varies widely within the range of speeds that are used.

Attempts have been made to provide the type of drive arrangement that is desired by, in effect, varying the load imposed upon a motor to control its speed. This has been done by connecting a brake to the external motor shaft in order to vary the load thereon. The ability of such systems to maintain regulated speeds can vary widely, depending upon the speed that is selected. In such arrangements as are known, moreover, the brake is necessarily positioned concentric with the shaft or connected thereto by gears. This introduces the difficulty of providing proper alignment through the use of additional bearings that must necessarily be closely aligned with the motor shaft bearings. Unless the alignment of the drive motor and the auxiliary brake mechanism is essentially perfect, slight periodic variations in speed are likely to result in a sort of "wobble" effect. This, in turn, produces periodic variations in the movement of the tape through the tape transport mechanism with the undesirable consequence that the signal carried on the tape is distorted. Undesirable friction is developed in the added bearings and the gearing or shaft coupling arrangements, which increases the required driving power and hampers the performance of the over-all drive mechanism. In addition to the disadvantages mentioned, it is obvious that such arrangements are relatively cumbersome and result in a drive mechanism of increased cost and complexity.

It is therefore an object of the present invention to provide an improved regulated drive arrangement for a tape transport mechanism.

It is another object of the invention to provide a compact and effective variable speed drive mechanism for a tape transport mechanism.

It is also an object of this invention to reduce the size, cost and complexity of a device capable of delivering rotational power at any of a large number of preselected speeds.

It is a further object of this invention to provide a rotational drive arrangement capable of improved regulation at any of a range of preselected speeds.

It is an additional object of this invention to provide a rotational drive mechanism having a reduced number of parts that are positioned with increased precision.

Briefly, a regulated drive arrangement in accordance with the present invention comprises an integral electrical motor and electrical brake combination concentric on the same shaft within the same housing but energized by separate windings. The entire rotary portion of the mechanism is suspended on a single pair of bearings that substantially eliminate the mechanical alignment and coupling problems and significantly reduce the driving power required. The drive mechanism may advantageously be energized directly from an A.C. line and operated at any selected speed below the line frequency synchronous speed. Control power may be supplied as desired to a D.C. brake windings in order to govern the braking torque that is exerted, and ultimately the rotational speed of the output shaft. The mean level of D.C. braking power may be readily varied to change from one output speed to another as desired without any necessity for controlling the A.C. driving power supplied to the motor. By thus controlling the braking power, the time required for changing from one selected speed to another is greatly reduced. Improved regulation at any selected speed is effected by the inclusion of a feedback loop including a tachometer connected to the motor output shaft and a corrector system that compares actual speed with that selected in order to control the level of braking power applied. When output speed varies from the selected level the braking torque is increased or decreased, and the shaft accelerates or decelerates to the selected speed. It will be noted that improved control of the drive is provided for reducing as well as for increasing speed, since the constant torque characteristic of the inventive arrangement is effective for changing speed in either direction.

One structural arrangement in accordance with the invention employs an Armco homogeneous rotor for the drive portion of a tape drive device in order to develop extremely smooth "cogless" torque. In this arrangement the D.C. brake portion is composed of a hysteresis rotor with appropriate windings to provide adequate braking for the desired regulation. Both the motor and brake rotors and windings are enclosed in a single housing and supported therein by two bearings as in a conventional motor. The result is a magnetic tape drive mechanism capable of achieving more precise speed regulation at preselected levels with enhanced efficiency and effectiveness.

A better understanding of the invention may be had from a consideration of the following detailed description taken in conjunction with the accompanying drawings, wherein like reference numerals are used to refer to similar elements, and in which:

FIGURE 1 is a cross-sectional view of one specific arrangement in accordance with the invention;

FIGURE 2 is an end view of a portion of the arrangement shown in FIGURE 1;

FIGURE 3 is an enlargement of a portion of FIGURE 2 presented to explain the operation of the brake arrangement of the invention;

Figure 4:
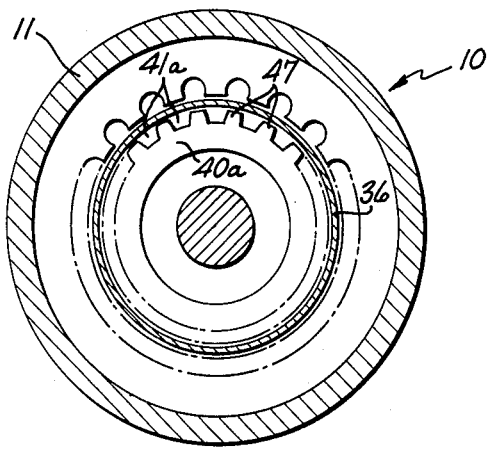
FIGURE 4 is a view of an alternative structure which may be employed in the arrangement of the invention.

In FIGURE 1, which is a cross-sectional view of a motor-brake assembly in accordance with the invention, there is shown a housing 10 comprising a frame 11 to which is attached an end bell 12. Extending through the center of the assembly is a shaft 14 that is maintained in position within the housing 10 by suitable bearings 15 and 16. The housing 10 encloses in combination a cynchronous motor 20 and a D.C. brake 30. The motor 20 comprises a rotor 22 and windings 24. In this particular exemplification of the invention, the rotor 22 comprises a central portion 23 of soft iron surrounded by a layer 25 of cobalt iron material exhibiting a high coercive force. With this arrangement the rotor 22 delivers extremely smooth, cogless torque which is desired in tape transport mechanisms.

The brake portion 30 of the arrangement of FIGURE 1 includes a rotor 32 in a cup-shaped configuration having a lateral portion 34, which may be of aluminum or steel. Affixed to the later portion 34, as by cementing, is a sleeve-shaped portion 36 of heat-treated cobalt that is selected for its high hysteresis loss. An inner ring 40 and an outer ring 42 of Armco iron also form part of the brake portion 30 of the assembly 10. The inner and outer rings 40 and 42 are secured to a backing plate 44 also of Armco iron that is fastened to the frame 11 to hold the rings 40 and 42 in position and to complete a magnetic flux path about a solenoid winding 46, the latter having terminal leads 47 fed through a hole in the backing plate 44 in order that current may be directed through the winding 46.

A better idea of the arrangement of the brake portion and its operation may be had from an examination of FIGURES 2 and 3 which are, respectively, an end view of the inner and outer rings 40 and 42 and an enlarged section thereof showing a portion of the sleeve 36 in position between the rings 40 and 42. The outer ring 42 has a plurality of slots 43 cut longitudinally along the inner surface and equally spaced thereabout. The inner ring 40 has an equal number of grooves 41 spaced about its periphery to match the slots 43. Both the grooves 41 and the slots 43 have arcuate cross-sectional configurations in the present embodiment. It will be noted, however, that the rings 40 and 42 are so positioned with respect to each other that the respective grooves 41 and slots 43 are displaced by one slot width from each other. The reason for this displacement will be apparent from a study of the detailed portion shown in FIGURE 3.

FIGURE 3 shows one groove 41 of the inner ring 40 disposed with respect to a pair of slots 43 of the outer ring 42. Shown positioned between the two rings 40 and 42 is a section of the cobalt sleeve 36 of the brake rotor. In the operation of the arrangement of the invention, as shown in FIGURE 1, current is directed through the winding 46 which serves to magnetize the inner and outer rings 40 and 42 to exhibit opposite magnetic poles at the gap in which the cobalt sleeve 36 is positioned. The polarity of these magnetic poles is immaterial to the operation of the invention so long as they are of opposite polarity with respect to each other. For the sake of illustration only, let it be assumed that the inner ring 40 is magnetized to develop a north magnetic pole while the outer ring 42 is magnetized to develop a south magnetic pole. Because of the relative displacement of the grooves 41 and slots 43, respectively, the magnetic flux lines follow a configuration through the cobalt sleeve 36, which may be represented by the arrows shown therein.

Figure 5:
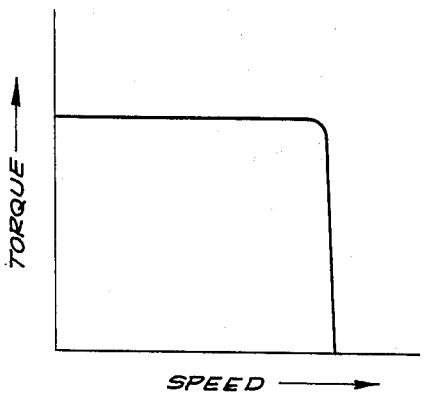
FIGURE 5 is a graphical presentation of a plot of torque versus speed which represents the operating characteristics of arrangements according to the invention.

In will be remembered that during the operation of the motor-brake assembly of the invention, the sleeve 36 is rotating with the shaft 14. Assume in the arrangement shown in FIGURE 3 that this produces a movement from right to left of the portion of the sleeve 36 that is therein shown. It is clear that the portion of the sleeve 36 that was on one side of the slot 43 moves to the other side thereof and experiences a corresponding shift in the direction of the magnetic flux passing through it. It has already been mentioned that the sleeve 36 is fabricated of a material exhibiting a high hysteresis loss. The continual shifting of direction of the magnetic domains within the material, corresponding to the varying direction of magnetic flux passing between the inner and outer rings 40 and 42 through a given portion of the sleeve 36, results in a relatively high hysteresis loss in the material of the sleeve 36. Another approach to an understanding of this phenomenon is to consider that the rotation of the sleeve 36 between the inner and outer rings 40 and 42 requires torque which is proportional to the strength of the magnetic field existing between the rings 40 and 42, which in turn is proportional to the current in the winding 46 (FIGURE 1). The system thus controls the output shaft speed by varying the braking torque exerted on the shaft. The motor 20 has highest torque at low speeds, when braking torque is highest, and lowest torque at high speeds, when braking torque is lowest. In consequence, this exemplification of the invention advantageously provides an output torque characteristic with respect to speed which corresponds roughly to the graph shown in FIGURE 5. From an examination of FIGURE 5, it will be seen that the torque developed at the output of the shaft 14 and which is available for application to a driven load remains substantially constant, independent of the speed of rotation at which the assembly is being operated, until the region of synchronous speed is approached. Arrangements in accordance with the invention which exhibit this particular torque-speed characteristic are particularly desirable for utilization in a tape transport mechanism.

Drive mechanisms in accordance with the invention have both small size and low cost, because they use a reduced number of parts. The motor and brake are readily positioned with desired alignment because they are mounted on a common shaft, and supported within the single housing between two bearings.

FIGURE 4 depicts an inner ring 40A having a configuration about its outer periphery that is slightly different from that of the ring 40 shown in FIGURES 1 and 2. The ring 40A of FIGURE 4 may be employed in place of the ring 40 to provide a second embodiment of the invention. The ring 40A is like the ring 40 except that its outer periphery is formed in the shape of a plurality of gear teeth 47. The number of teeth 47 corresponds to the number of grooves 41 shown in the ring 40; and the ring 40A, in operation, would be positioned within the ring 42 (see FIGURE 2) so that the gaps 41A between the teeth 47 correspond to the position of the grooves 41 in FIGURE 2.

Figure 6:
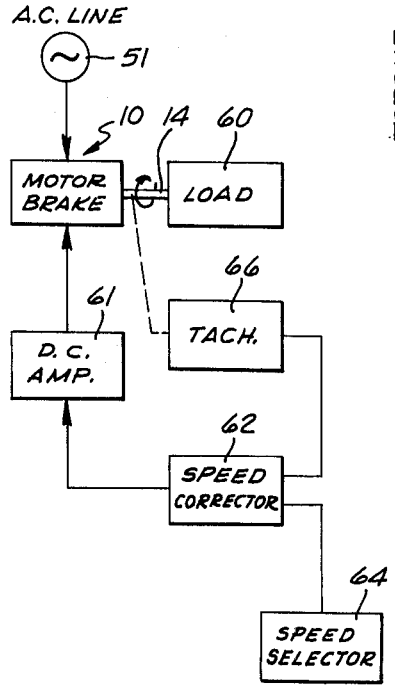
FIGURE 6 is a block diagram representing a system incorporating the invention.

FIGURE 6 illustrates in block diagram form a system in which an arrangement in accordance with the invention may be employed to advantage. This constitutes a closed loop servo system that controls acceleration of the output shaft in achieving speed regulation. In FIGURE 6, the motor-brake 10 is shown having its output shaft 14 coupled to a load 60. The motor 20 is driven by power supplied from an A.C. power supply 51; and current for the brake solenoid winding 46 is supplied by a D.C. amplifier 61. The D.C. amplifier 61 is driven by a speed corrector 62 that receives signals from a speed selector 64 and a tachometer 66, the latter being mechanically coupled to the output shaft 14. The term "speed corrector" is a general one that is intended to refer to any error signal generator suitable for closing the servo loop.

In the operation of the arrangement of FIGURE 6, the desired nominal speed is selected by varying the setting of the speed selector 64. A signal corresponding to this setting is developed in the speed corrector 62 and applied to the D.C. amplifier 61, which controls the current in the brake winding 46 of the motor-brake 10. The actual speed of rotation of the output shaft 14, driving the load 60, is represented by the tachometer 66, which applies a corresponding signal to the input of the speed corrector 62. The signals from the tachometer 66 and the speed selector 64 are compared in the speed corrector 62, which varies the control of the D.C. amplifier 61 according to any difference between the speed of rotation of the output shaft 14 and the particular speed selected by the setting of the speed selector 64. If the actual speed is too slow the braking torque is diminished, permitting the output shaft 14 to accelerate. This control of acceleration means that the system operates as an integrator in regulating output shaft speed. By virtue of this arrangement, a very accurate and precise control is maintained of the rotational speed at which the load 60 is driven by the motor-brake 10. Further, a regulated variable speed control of the assembly comprising the motor-brake 10 and the load 60 is maintained over a wide range of available speeds, all of which may be employed under substantially constant output torque conditions. The use of a closed loop servo system makes best use of the capabilities of the mechanism, because the speed-torque characteristic does not readily permit a selected speed to be maintained by setting the braking torque in an open loop arrangement.

Although there have been described above specific arrangements of a speed controlled motor in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be part of the invention.

What is claimed is:

1. A motor-brake combination having a common housing and shaft, the brake comprising a pair of inner and outer rings mounted on said housing, the inner and outer rings being arranged to provide a magnetic path having a predetermined gap between the inner and outer rings, a solenoid winding mounted on said housing for establishing a magnetic field, a sleeve of a high hysteresis loss material attached to the motor shaft to rotate therewith and positioned within the gap between the inner and outer rings, and means for establishing a magnetic field within said gap corresponding to a desired change in the speed of rotation of said combination, thus to control the hysteresis loss in the sleeve material to vary the braking torque and govern changes in the speed of rotation of the motor-brake shaft.

2. A controlled rotational drive arrangement exhibiting substantially constant output torque over a wide range of selected speeds comprising a common housing, a common shaft, a pair of bearings supporting said shaft within said housing, a motor rotor and a brake rotor attached to said shaft between said bearings, the brake rotor comprising a cup shaped configuration having a peripheral sleeve portion of a high hysteresis loss material, an inner ring and an outer ring mounted on said housing and positioned on opposite sides of said sleeve portion, the outer ring having a plurality of equally spaced holes positioned around the surface thereof adjacent to said sleeve portion, the inner ring having an equal plurality of slots spaced about the surface thereof adjacent to said sleeve portion, said slots and said rings being displaced relative to each other by the width of one slot, means for establishing a magnetic field between said inner and outer ring in the region of the sleeve portion of said brake rotor, and means for varying the magnetic field to control the braking torque exerted on said shaft.

3. A constant torque drive mechanism having a variable speed of operation which is controllable over a wide speed range comprising a common shaft, a pair of bearings respectively situated near opposite ends of said shaft for positioning said shaft within said housing, a motor rotor attached to said shaft within said housing and motor field windings mounted within said housing, and a brake portion comprising a rotor connected to said shaft, inner and outer concentric rings attached to said housing and having adjacent surfaces of a matching configuration, a sleeve-shaped portion of hysteretic material attached to said rotor and positioned between said rings the corresponding portions of the matching surfaces of the inner and outer rings being slightly displaced with respect to one another, and means for varying the magnetic field to set the braking torque and control acceleration of the common shaft of the motor-brake combination.

4. Apparatus in accordance with claim 3 wherein said inner ring contains a plurality of semicircular shaped slots equally spaced about the periphery thereof.

5. Apparatus in accordance with claim 3 wherein said inner ring is in the configuration of a gear having a plurality of equally spaced teeth positioned about the periphery thereof.

6. In combination an A.C. synchronous motor, a hysteresis brake, a common housing enclosing said motor and said brake, a common shaft coupling said motor and said brake within said housing, said brake comprising a rotor having a circular sleeve of hysteretic material mounted on said shaft, a pair of rings mounted on said housing and encircling said shaft and arrayed on opposite sides of said sleeve, said rings being fixedly coupled to said housing, and means for establishing a magnetic field in the vicinity of said sleeve which varies in radial direction with the angular position thereof as the sleeve rotates about the shaft, said field determining the braking torque applied to said shaft.

7. Apparatus in accordance with claim 6 wherein said magnetic field is variable in magnitude.

8. Apparatus in accordance with claim 6 wherein the means for varying the direction of magnetic field in the vicinity of the sleeve as a function of rotational position comprises a plurality of regularly spaced projections formed between adjacent holes positioned about the inner surface of the outer ring and a similar number of equally spaced projections positioned about the outer surface of the inner ring, the projections of the inner and outer rings being displaced relative to each other.

References Cited by the Examiner

UNITED STATES PATENTS

| | | | |
|---|---|---|---|
| 739,096 | 9/1903 | De Lignieres | 310—93 |
| 1,008,617 | 11/1911 | Scheeffer | 324—152 X |
| 1,477,782 | 12/1923 | Steinmetz | 310—93 X |
| 2,119,819 | 6/1938 | List | 310—105 X |
| 2,603,678 | 7/1952 | Helmer | 310—93 X |
| 2,630,466 | 3/1953 | Landis | 310—93 |
| 2,806,158 | 9/1957 | Emery | 310—103 |
| 2,912,607 | 11/1959 | Duncan | 310—99 |

ORIS L. RADER, *Primary Examiner.*

DAVID X. SLINEY, *Examiner.*

JOHN F. COUCH, *Assistant Examiner.*